(12) United States Patent
Wada et al.

(10) Patent No.: US 8,970,165 B2
(45) Date of Patent: Mar. 3, 2015

(54) DETERMINATION CIRCUIT

(71) Applicants: Atsushi Wada, Gifu-ken (JP); Shigeto Kobayashi, Gifu-ken (JP)

(72) Inventors: Atsushi Wada, Gifu-ken (JP); Shigeto Kobayashi, Gifu-ken (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 367 days.

(21) Appl. No.: 13/680,693

(22) Filed: Nov. 19, 2012

(65) Prior Publication Data

US 2013/0154547 A1  Jun. 20, 2013

(30) Foreign Application Priority Data

Nov. 17, 2011  (JP) ................................. 2011-251897

(51) Int. Cl.
*H02J 7/00* (2006.01)

(52) U.S. Cl.
CPC ............. *H02J 7/0045* (2013.01); *H02J 7/0006* (2013.01); *H02J 7/0052* (2013.01); *H02J 2007/0001* (2013.01); *H02J 2007/0062* (2013.01)
USPC .......................................... 320/107; 320/106

(58) Field of Classification Search
CPC ...... Y02E 60/12; H02J 7/0004; H02J 7/0006; H02J 7/0042; H02J 7/0045; H01M 10/48; H01M 10/4257; H01M 10/46; H01M 10/44
USPC .......................................................... 320/107
See application file for complete search history.

(56) References Cited

U.S. PATENT DOCUMENTS

| 5,467,304 | A | * | 11/1995 | Uchida et al. ................. 365/174 |
| 5,595,509 | A | * | 1/1997 | Fry et al. ........................ 439/752 |
| 6,186,832 | B1 | * | 2/2001 | Madden et al. ............... 439/638 |
| 2003/0105567 | A1 | * | 6/2003 | Koenig et al. .................. 701/36 |
| 2005/0073282 | A1 | * | 4/2005 | Carrier et al. ................. 320/106 |
| 2006/0186895 | A1 | * | 8/2006 | Hsu et al. ...................... 324/610 |
| 2011/0018522 | A1 | * | 1/2011 | Li et al. ......................... 323/318 |
| 2011/0260694 | A1 | * | 10/2011 | Bourilkov et al. ............ 320/157 |

FOREIGN PATENT DOCUMENTS

JP  2010-205437 A  9/2010

OTHER PUBLICATIONS

Patent Abstracts of Japan, Publication No. 2010-205437, Published on Sep. 16, 2010, 1 page.

* cited by examiner

*Primary Examiner* — Arun Williams
(74) *Attorney, Agent, or Firm* — Robert F. Hightower (57) ABSTRACT

A determination circuit includes a first detecting unit that detects whether first and second power-supply terminals are connected based on a voltage at the second power-supply terminal of a coupling unit that includes the second power-supply terminal connectable to the first power-supply terminal of a device including first and second terminals, and third and fourth terminals connectable respectively to the first and the second terminals. The determination circuit also includes a voltage applying unit that applies first and second voltages to the third and fourth terminals respectively, a second detecting unit that detects that the first and the second terminals are connected to the third and the fourth terminals, respectively, and a discrimination unit that discriminates a type of the device based on voltages at the third and the fourth terminals connected to the first and second terminals, respectively.

5 Claims, 8 Drawing Sheets

| MODE | FIRST STEP | | | SECOND STEP | TYPE |
|---|---|---|---|---|---|
| | Vc1 | Vc2 | Vc3 | Vc1 | |
| 1 | H | H | H | H | CHARGER 15a : COMPANY A |
| 2 | H | H | H | L | CHARGER 15c : STANDARD A |
| 3 | H | H | L | - | CHARGER 15b : COMPANY B |
| 4 | H | L | L | - | OPEN |
| 5 | L | L | L | H | CHARGER 15d : STANDARD B |
| 6 | L | L | L | L | COMMUNICATION DEVICE |

DETERMINATION CIRCUIT

CROSS-REFERENCE TO RELATED APPLICATION

This application claims the benefit of priority to Japanese Patent Application No. 2011-251897, filed Nov. 17, 2011, of which full contents are incorporated herein by reference.

BACKGROUND OF THE INVENTION

1. Field of the Invention

The present invention relates to a determination circuit.

2. Description of the Related Art

Many of recently popular mobile devices are provided with ports connected to, for example, Micro-USB (Universal Serial Bus) plugs (see. e.g., Japanese Laid-Open Patent Publication No. 2010-205437). These ports are connected with plugs for Micro-USB (hereinafter simply referred to as plugs) from devices such as a personal computer and a charger.

The plugs are generally provided with a terminal where information (identification information) of a type of a device, etc., appears, specifically, an identification terminal having a resistor for identification connected between the terminal and the ground. Thus, if a plug is connected to a mobile device, the mobile device acquires identification information, thereby being able to identify a type of the device connected to the mobile device, and the like.

However, in some devices such as a charger, etc., a resistance value indicative of a type of a device may be set at a predetermined terminal (e.g., a terminal for data communication) different from the identification terminal. Recently, as the types of chargers have been increased, various values have been used as resistance values of the predetermined terminals of the plugs. As a result, a mobile device may not determine a connected device correctly.

SUMMARY OF THE INVENTION

A determination circuit according to an aspect of the present invention includes: a first detecting unit configured to detect whether first and second power-supply terminals are connected to each other, based on a voltage at the second power-supply terminal of a coupling unit, wherein the coupling unit includes the second power-supply terminal connectable to the first power-supply terminal of a device including the first power-supply terminal applied with a power-supply voltage and first and second terminals, and third and fourth terminals connectable respectively to the first and the second terminals having impedance corresponding to a type of the device, after the first power-supply terminal and the second power-supply terminal are connected to each other; a voltage applying unit configured to, when the first and the second power-supply terminals are connected to each other, apply a first voltage to the third terminal as well as apply a second voltage to the fourth terminal; a second detecting unit configured to detect that the first and the second terminals are connected to the third and the fourth terminals, respectively, when a voltage level at the third terminal is not equal to a level of the first voltage or when a voltage level at the fourth terminal is not equal to a level of the second voltage, after the second voltage is applied to the fourth terminal while the first voltage is applied to the third terminal; and a discrimination unit configured to discriminate a type of the device based on voltages at the third and the fourth terminals when it is detected that the first and the second terminals are connected to the third and the fourth terminals, respectively.

BRIEF DESCRIPTION OF THE DRAWINGS

For more thorough understanding of the present invention and advantages thereof, the following description should be read in conjunction with the accompanying drawings, in which:

FIG. 2 is a diagram illustrating a configuration of a part of a plug 16a used for a charger 15a;

DETAILED DESCRIPTION OF THE INVENTION

At least the following details will become apparent from descriptions of this specification and of the accompanying drawings.

Figure 1:
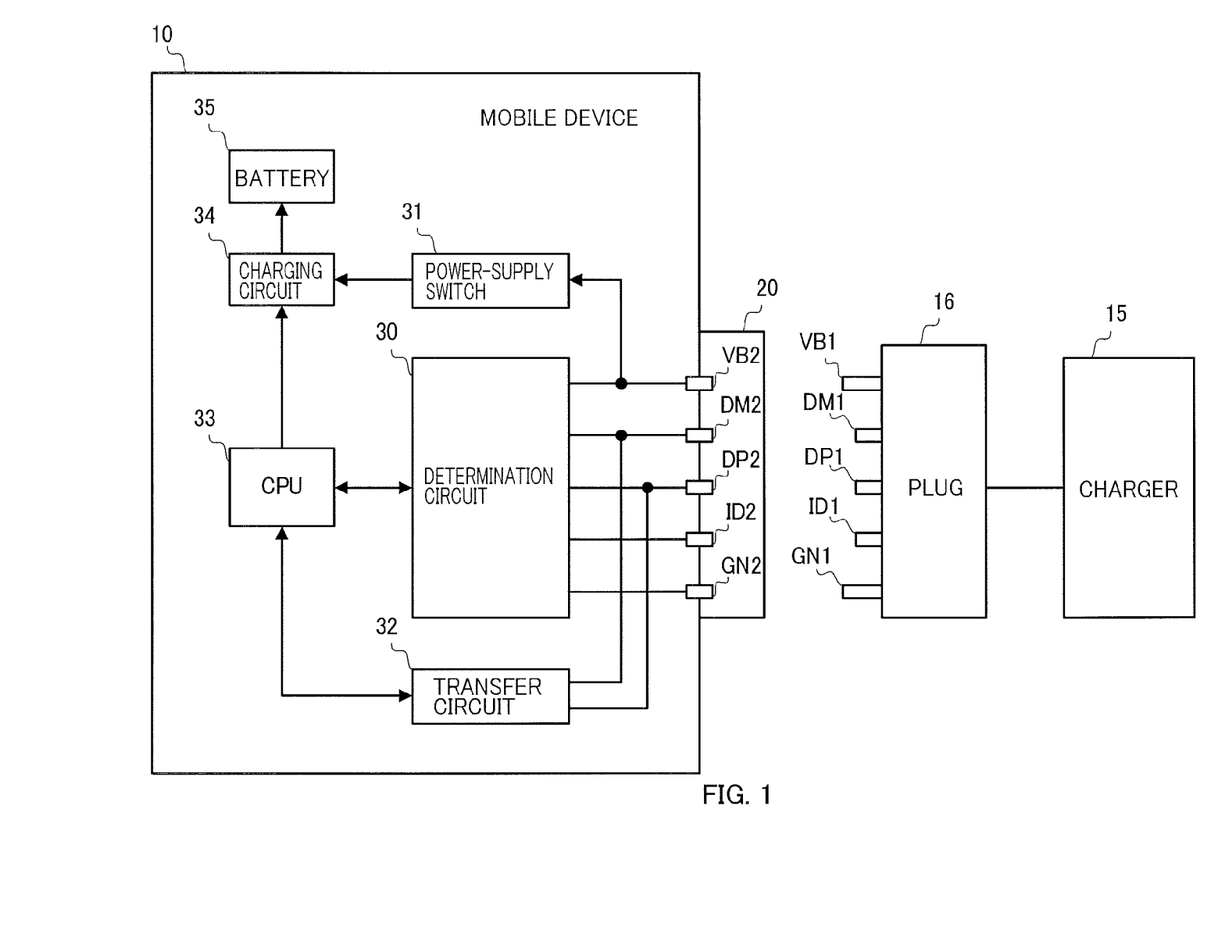
FIG. 1 is a schematic diagram illustrating a mobile device 10 and a charger 15 according to an embodiment of the present invention.

FIG. 1 is a schematic diagram of a mobile device 10 and a charger 15 according to an embodiment of the present invention. The mobile device 10 is a smartphone, for example, and includes a port 20 (coupling unit) connected with a plug for Micro-USB, for example.

The charger 15 is a device configured to charge a battery via a plug 16 for Micro-USB, for example. The plug 16 is provided with terminals VB1, DM1, DP1, ID1, and GN1.

The terminals VB1 and GN1 are terminals respectively corresponding to a power-supply terminal and a ground terminal in a common plug for Micro-USB. A power-supply voltage Vbus is applied to the terminal VB1 (first power-supply terminal) and a ground voltage (0 V) is applied to the terminal GN1.

The terminal ID1 is a terminal corresponding to an identification terminal in a typical plug for Micro-USB. However, the terminal ID1 according to an embodiment of the present invention is not connected to the identification resistor and the terminal ID1 is in an electrically floating state.

The terminals DP1 and DM1 are terminals corresponding to terminals for data communication in a common plug for Micro-USB. However, the charger 15 does not perform data communication with the mobile device 10. Thus, in an embodiment of the present invention, for example, as depicted in FIGS. 2 to 5, the terminals DP1 (first terminal) and DM1 (second terminal) are connected with resisters, etc., such that the terminal DP1 and the terminal DM1 respectively have impedances (resistance values) corresponding to the type of the charger 15. In FIGS. 2 to 5, the terminals other than the terminals DP1 and DM1 are not depicted for convenience.

Figure 2:
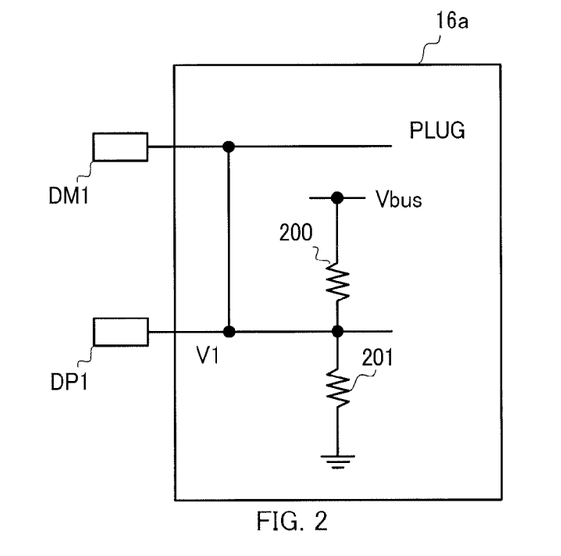

FIG. 2 is a diagram for describing a state of the terminals DP1 and DM1 of a plug 16a used for a charger 15a manufactured by Company A. Each of the terminals DP1 and DM1 is connected with a resistor 200, connected to the terminal VB1 to be applied with a power-supply voltage Vbus, and a resistor 201 connected to the terminal GN1 to be grounded. Thus, a voltage V1 is generated at the terminals DP1 and DM1 which is in accordance with the division ratio of the resistors 200 and 201 connected in series between the power-supply voltage Vbus and the ground.

Figure 3:
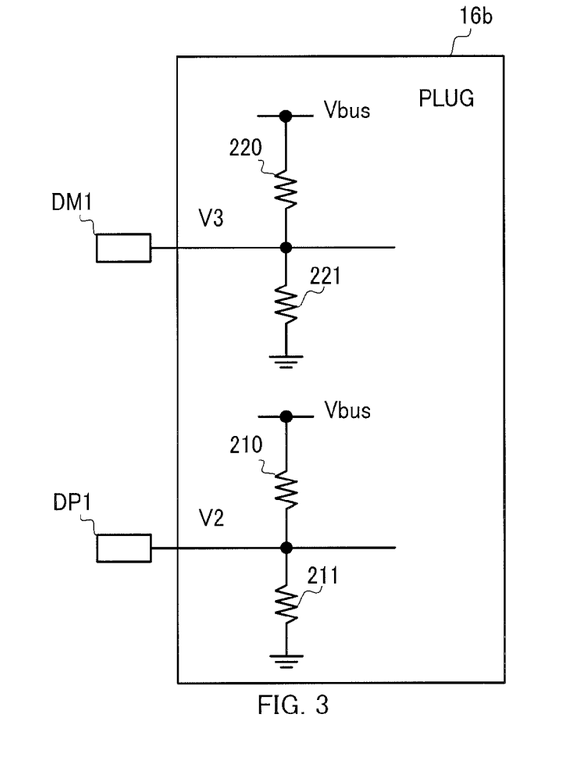
FIG. 3 is a diagram illustrating a configuration of a part of a plug 16b used for a charger 15b.

FIG. 3 is a diagram for describing a state of the terminals DP1 and DM1 of a plug 16b used for a charger 15b manufactured by Company B.

The terminal DP1 is connected with a resistor 210 having one end applied with the power-supply voltage Vbus and a resistor 211 having one end grounded. Thus, a voltage V2 is generated at the terminal DP1 which is in accordance with the division ratio of the resistors 210 and 211 connected in series between the power-supply voltage Vbus and the ground. Similarly to the terminal DP1, the terminal DM1 is connected with a resistor 220 having one end applied with the power-supply voltage Vbus and a resistor 221 having one end grounded. Thus, a voltage V3 is generated at the terminal DM1 which is in accordance with the division ratio of the resistors 220 and 221 connected in series between the power-supply voltage Vbus and the ground. In an embodiment of the present invention, the resistance values of the resistor 200 etc., are selected such that the voltages V1 to V3 satisfy a relationship of V1>V2>V3, for example. The resistors 210 and 220 are connected to the terminal VB1 similarly to the resistor 200, and the resistors 211 and 221 are connected to the terminal GN1 similarly to the resistor 201. The chargers 15a and 15b are chargers manufactured based on proprietary standards.

Figure 4:
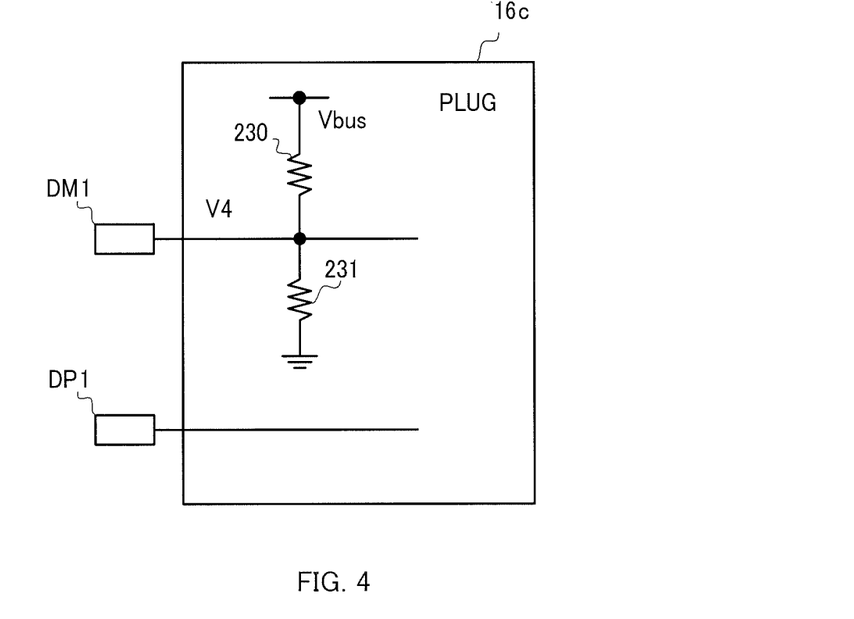
FIG. 4 is a diagram illustrating a configuration of a part of a plug 16c used for a charger 15c.

FIG. 4 is a diagram for describing a state of the terminals DP1 and DM1 of a plug 16c used for a charger 15c manufactured based on a predetermined standard A. No voltage is applied to the terminal DP1 and the terminal DP1 is in the electrically floating state. On the other hand, similarly to FIG. 3, the terminal DM1 is connected with a resistor 230 having one end applied with the power-supply voltage Vbus and a resistor 231 having one end grounded. Thus, a voltage V4 is generated at the terminal DM1 which is in accordance with the division ratio of the resistors 230 and 231 connected in series between the power-supply voltage Vbus and the ground. The resistance values of the resistor 230 etc., are selected such that the voltage V4 satisfies a relationship of V4>V1, for example.

Figure 5:
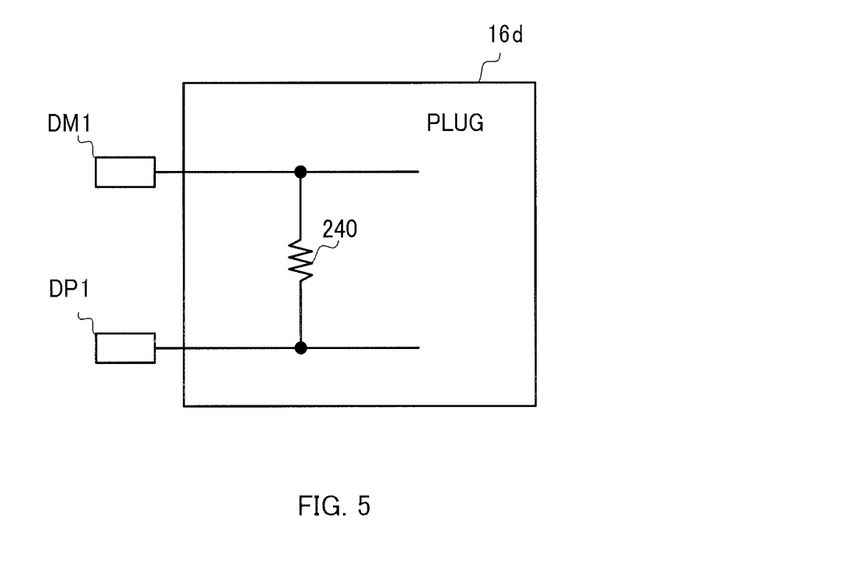
FIG. 5 is a diagram illustrating a configuration of a part of a plug 16d used for a charger 15d.

FIG. 5 is a diagram for describing a state of the terminals DP1 and DM1 of a plug 16d used for a charger 15d manufactured based on a predetermined standard B. Although the terminal DP1 and the terminal DM1 are connected via a resistor 240, no voltage is applied to the terminals DP1 and DM1. Thus, the terminals DP1 and DM1 are in an electrically floating state.

As such, the terminals DP1 and DM1 of the plug 16 have impedances corresponding to the type of the charger 15. Although a description has been given here of the case where the device connected to the mobile device 10 is the charger 15, if the device connected to the mobile device 10 is a device capable of data communication, for example, the terminals DP1 and DM1 act as terminals for data communication. In such a case, the terminals DP1 and DM1 are generally connected to a 15-kΩ pull-down resistor and separately to a terminating resistor. In the chargers 15a to 15d of the respective standards, for example, charging currents, charging voltages, etc., vary with the standards.

As depicted in FIG. 1, the port 20 of the mobile device 10 is provided with terminals VB2, DM2, DP2, ID2, and GN2 respectively connected to the terminals VB1, DM1, DP1, ID1, and GN1 of the plug 16. The terminals VB1 and GN1 are formed longer than other terminals so that, when the plug 16 is connected to the mobile device 10, the terminals VB1 and GN1 among the terminals of the plug 16 are connected to the terminals of the mobile device 10 before other terminals thereamong are connected thereto.

The mobile device 10 includes a determination circuit 30, a power-supply switch 31, a transfer circuit 32, a CPU (Central processing Unit) 33, a charging circuit 34, and a battery 35.

When the terminals of the plug 16 are connected to the terminals of the mobile device 10, the determination circuit 30 determines a type etc., of a device connected to the mobile device 10 based on voltages at the terminal DP2 (third terminal) and the terminal DM2 (forth terminal). Then, the determination circuit 30 outputs a determination result to the CPU 33.

When the terminal VB1 and the terminal VB2 are connected, i.e., when the voltage at the terminal VB2 (second power-supply terminal) becomes equal to the power-supply voltage Vbus at the terminal VB1, the power-supply switch 31 is turned on and outputs the power-supply voltage Vbus to the charging circuit 34. The power-supply switch 31 is turned off when the terminal VB1 and the terminal VB2 are not connected.

If the device connected to the mobile device 10 is a data communication device, the transfer circuit 32 exchanges data between the terminals DP2 and DM2 and the CPU 33 based on an instruction of the CPU 33.

The CPU 33 integrally controls the blocks of the mobile device 10 based on an instruction from a user, a determination result of the determination circuit 30, etc.

If the device connected to the mobile device 10 is the charger 15, the charging circuit 34 charges the battery 35 with a charging current, etc., conforming to the type of the charger 15 based on an instruction from the CPU 33. The charging circuit 34 charges the battery 35 based on the power-supply voltage Vbus outputted via the power-supply switch 31. As the battery 35, a lithium-ion battery is used, for example.

==Details of Determination Circuit 30==

Figure 6:
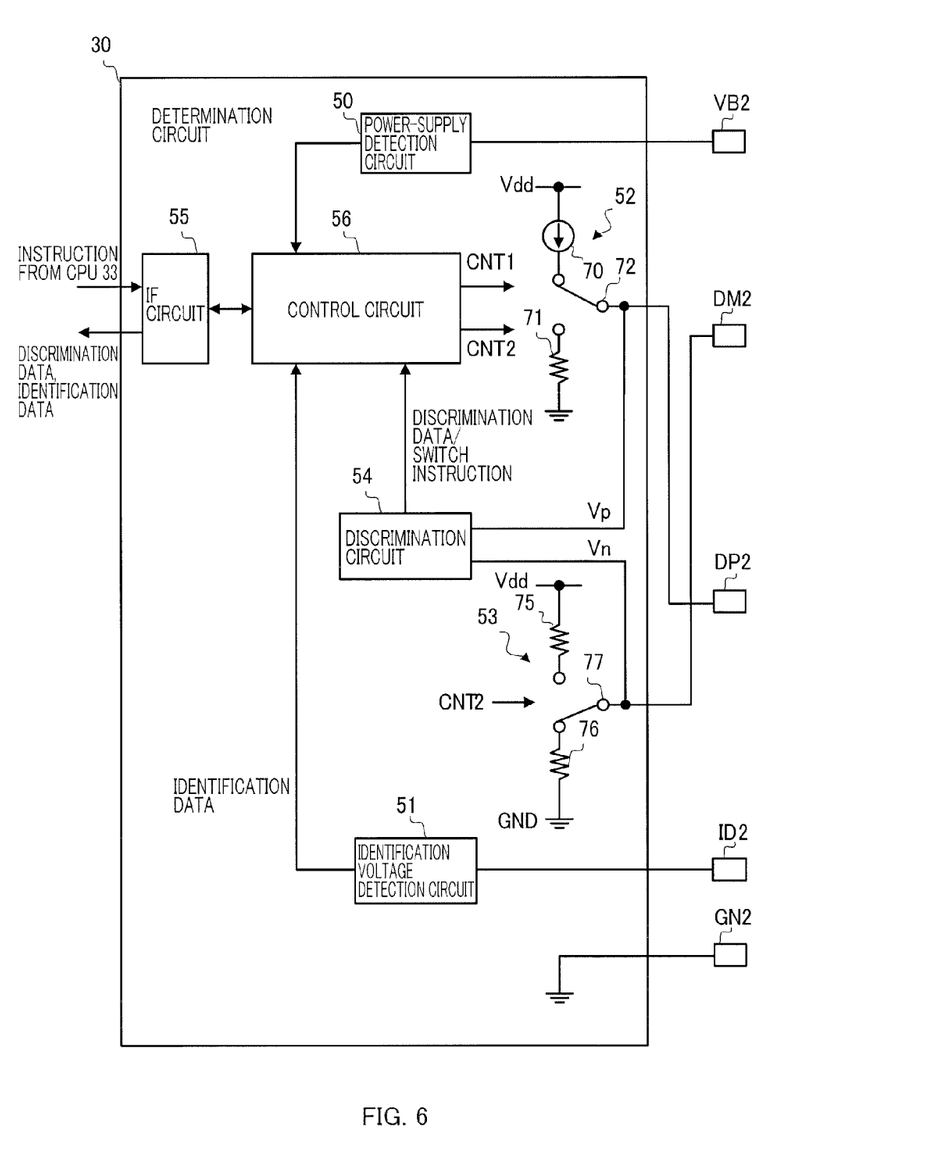
FIG. 6 is a diagram illustrating an example of a determination circuit 30 according to an embodiment of the present invention.

FIG. 6 is a diagram illustrating details of the determination circuit 30. The determination circuit 30 includes a power-supply detection circuit 50, an identification voltage detection circuit 51, voltage application circuits 52, 53, a discrimination circuit 54, an IF (interface) circuit 55, and a control circuit 56.

The power-supply detection circuit 50 (first detection unit) detects whether the power-supply voltage Vbus at the terminal VB1 is applied to the terminal VB2, i.e., whether the terminal VB1 and the terminal VB2 are connected, based on the voltage of the terminal VB2.

The identification voltage detection circuit 51 acquires a voltage generated (changed) depending on an identification resistor of a cable connected to the terminal ID2. If the acquired voltage is a voltage indicative of a predetermined device connected to the mobile device 10, the identification voltage detection circuit 51 outputs identification data indicative of the connected device to the control circuit 56. For example, if the charger 15 is connected, the cable has no identification resistor and no change is caused in the voltage at the terminal ID2. Thus, in such a case, the identification voltage detection circuit 51 does not output identification data. However, if a charger different from the chargers 15a to 15d described in an embodiment of the present invention (e.g., a charger manufactured by a company different from Companies A and B) is connected and a cable has an identification resistor, the voltage at the terminal ID2 may be changed.

The control circuit 56 controls the voltage application circuits 52 and 53 based on the detection results of the power-supply detection circuit 50 and the identification voltage detection circuit 51. The control circuit 56 will be described later in detail.

The voltage application circuit 52 is a circuit configured to apply a power-supply voltage Vdd (first voltage) or a ground voltage (third voltage: 0 V) via an element having a predetermined impedance to the terminal DP2 based on a control signal CNT1 from the control circuit 56, and includes a current source 70, a resistor 71, and a switch 72.

The current source 70 (first element) is an element to pull up the terminal DP2, and the resistor 71 (second element) is an element to pull down the terminal DP2. Although the current source 70 is used here as an example of the element to pull up the terminal DP2, a resistor may be used instead of the current source 70, for example. Similarly, a current source may be used as an example of the element to pull down the terminal DP2 instead of the resistor 71. That is, an element connected to the terminal DP2 may be any element capable of "pulling up" or "pulling down" the terminal DP2.

The switch 72 connects the current source 70 and the terminal DP2 when the control circuit 56 outputs the control signal CNT1 indicative of "pull-up", and connects the resistor 71 and the terminal DP2 when the control circuit 56 outputs the control signal CNT1 indicative of "pull-down". The switch 72 causes the terminal DP2 to become in an electrically opened state when the control circuit 56 outputs the control signal CNT1 indicative of "open".

Similarly to the voltage application circuit 52, the voltage application circuit 53 is a circuit configured to apply a power-supply voltage Vdd (fourth voltage) or a ground voltage (second voltage) via an element having a predetermined impedance to the terminal DM2 based on a control signal CNT2 from the control circuit 56, and includes resistors 75, 76, and a switch 77.

The resistor 75 is an element to pull up the terminal DM2 and the resistor 76 is an element to pull down the terminal DM2. Similarly to the current source 70 described above, the resisters 75 and 76 may be any elements capable of "pulling up" or "pulling down" the terminal DM2.

The switch 77 connects the resistor 75 and the terminal DM2 when the control circuit 56 outputs the control signal CNT2 indicative of "pull-up", and connects the resistor 76 and the terminal DM2 when the control circuit 56 outputs the control signal CNT2 indicative of "pull-down". The switch 77 causes the terminal DM2 to become in an electrically opened state when the control circuit 56 outputs the control signal CNT2 indicative of "open".

The discrimination circuit 54 discriminates the type of the device 15 connected to the mobile device 10, and outputs discrimination data indicative of a discrimination result to the control circuit 56. The discrimination circuit 54 outputs a switch instruction to change the state of the terminals DP2 and DM2 to the control circuit 56.

The IF circuit 55 exchanges various types of information between the CPU 33 and the control circuit 56. Specifically, the IF circuit 55 outputs various instructions (e.g., discrimination start instruction) from the CPU 33 to the control circuit 56. The IF circuit 55 outputs discrimination data, identification data, etc., to the CPU 33.

When the power-supply detection circuit 50 detects the connection between the terminals VB1 and VB2, the control circuit 56 integrally controls the blocks in the determination circuit 30. Specifically, if the power-supply detection circuit 50 detects the connection between the terminals VB1 and VB2 while the discrimination start instruction from the CPU 33 is inputted to the control circuit 56, the control circuit 56 controls the voltage application circuits 52 and 53 so that the terminal DP2 is "pulled up" and the terminal DM2 is "pulled down". The control circuit 56 controls the voltage application circuits 52 and 53 based on the switch instruction so that the terminal DP2 is "pulled down" while the terminal DM2 is "pulled up". If the discrimination start instruction is not inputted or if the power-supply detection circuit 50 does not detect the connection between the terminals VB1 and VB2, the control circuit 56 controls the voltage application circuits 52 and 53 so as to cause the terminals DP2 and DM2 to be in the open state. As such, the control circuit 56 controls the voltage application circuits 52 and 53 based on a detection result of the power-supply detection circuit 50. However, if a predetermined instruction from the CPU 33 is inputted to the control circuit 56, the control circuit 56 performs similar control.

A step of "pulling up" the terminal DP2 and "pulling down" the terminal DM2 will hereinafter be referred to as a "first step". On the other hand, a step of "pulling down" the terminal DP2 and "pulling up" the terminal DM2 will be referred to as a "second step". The voltage application circuits 52, 53 and the control circuit 56 are equivalent to a voltage applying unit.

<<Details of Discrimination Circuit 54>>

Figure 7:
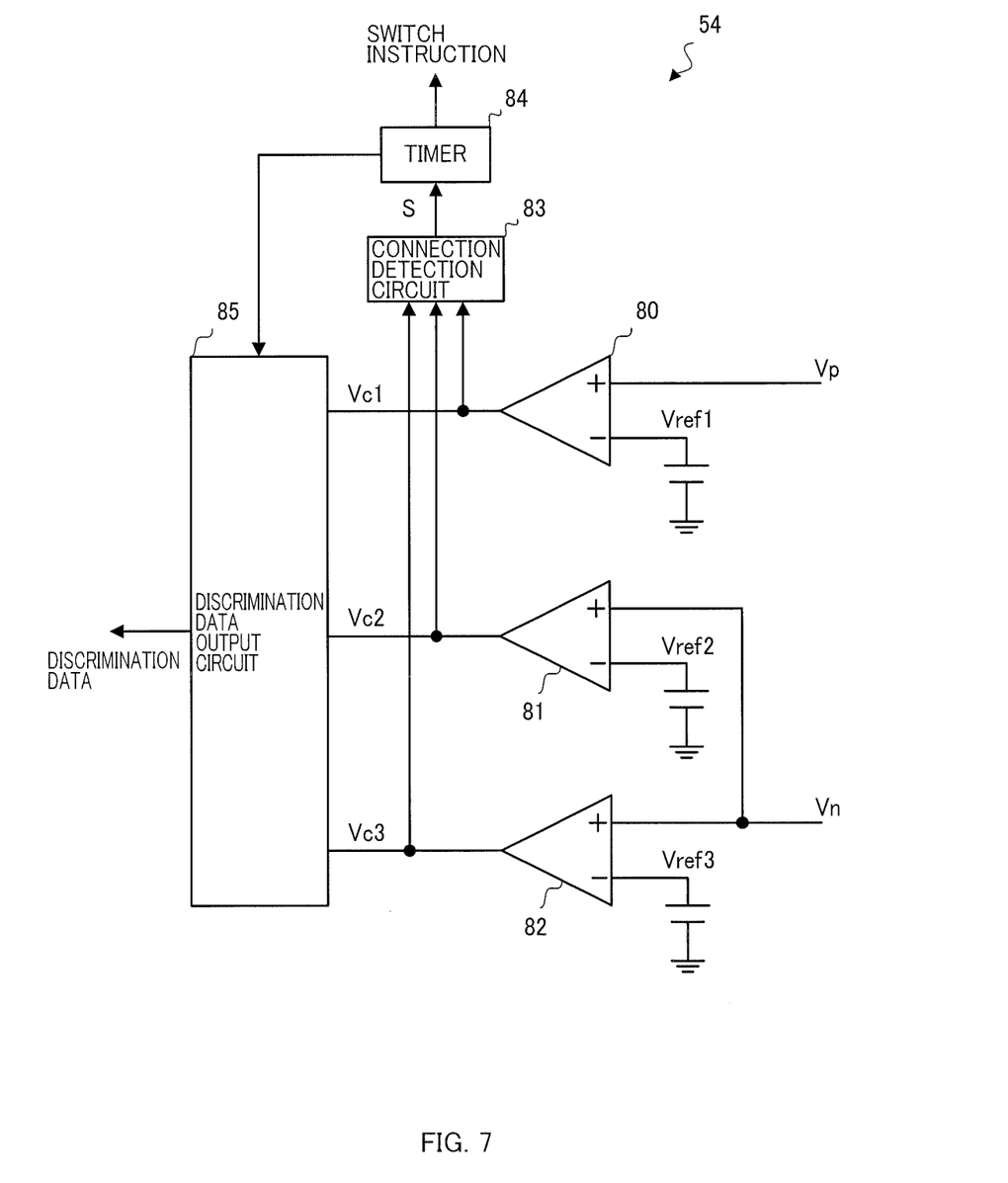
FIG. 7 is a diagram illustrating an example of a configuration of a discrimination circuit 54.

FIG. 7 is a diagram illustrating details of the discrimination circuit 54. The discrimination circuit 54 includes comparators 80 to 82, a connection detection circuit 83, a timer 84, and a discrimination data output circuit 85.

The comparator 80 is a circuit configured to compare a voltage Vp with a reference voltage Vref1; the comparator 81 is a circuit configured to compare a voltage Vn with a reference voltage Vref2; and the comparator 82 is a circuit configured to compare the voltage Vn with a reference voltage Vref3. The comparators 80 to 82 output comparison signals Vc1 to Vc3, respectively, as comparison results. In an embodiment of the present invention, the reference voltage Vref1 to the reference voltage Vref3 satisfy the relationship of Vref1>Vref2>Vref3, for example. Further, in an embodiment of the present invention, the reference voltages Vref1 to Vref3 are set such that the comparison signal Vc1 goes high while the comparison signals Vc2 and Vc3 goes low, if the terminal DP2 is pulled up thereby causing the voltage of the terminal DP2 to be set at the voltage Vdd and the terminal DM2 is pulled down thereby causing the voltage of the terminal DM2 to be set at 0 V.

The connection detection circuit 83 detects whether the terminals DP1 and DM1 are respectively connected to the terminals DP2 and DM2, based on the comparison signals Vc1 to Vc3. When the terminal DP2 is pulled up to the voltage Vdd and the terminal DM2 is pulled down to 0 V, the comparison signals Vc1, Vc2, and Vc3 go high, low, and low ("H", "L", "L"). If the comparison signals Vc1, Vc2, and Vc3 are changed from ("H", "L", "L"), i.e., when the voltage of the terminal DP2 is no longer the voltage Vdd or when the voltage of the terminal DM2 is no longer 0 V, the connection detection circuit 83 detects that the terminals DP1 and DM1 having some impedance are connected to the terminal DP2 and DM2. Thereafter, the connection detection circuit 83 changes a detection signal S from low to high.

The timer 84 measures a predetermined time period T1 from the detection of the connection between the terminals DP1, DM1 and the terminals DP2, DM2. If the predetermined time period T1 is measured, the switch instruction to change the state (step) of the terminals DP2 and DM2 from the "first step" to the "second step" is outputted.

The discrimination data output circuit 85 acquires the comparison signals Vc1 to Vc3 at a predetermined timing Ta before the predetermined time period T1 has elapsed in the "first step", based on the output of the timer 84. Further, the discrimination data output circuit 85 acquires the comparison signal Vc1 at a predetermined timing Tb in the "second step" based on the output of the timer 84. The discrimination data output circuit 85 outputs the discrimination data corresponding to a type of the device connected to the mobile device 10 based on the comparison signals Vc1 to Vc3 acquired in each of the "first step" and the "second step".

The comparators 80 to 82 and the connection detection circuit 83 are equivalent to a second detecting unit, and the comparators 80 to 82 and the discrimination data output circuit 85 are equivalent to a discrimination unit.

Figure 8:
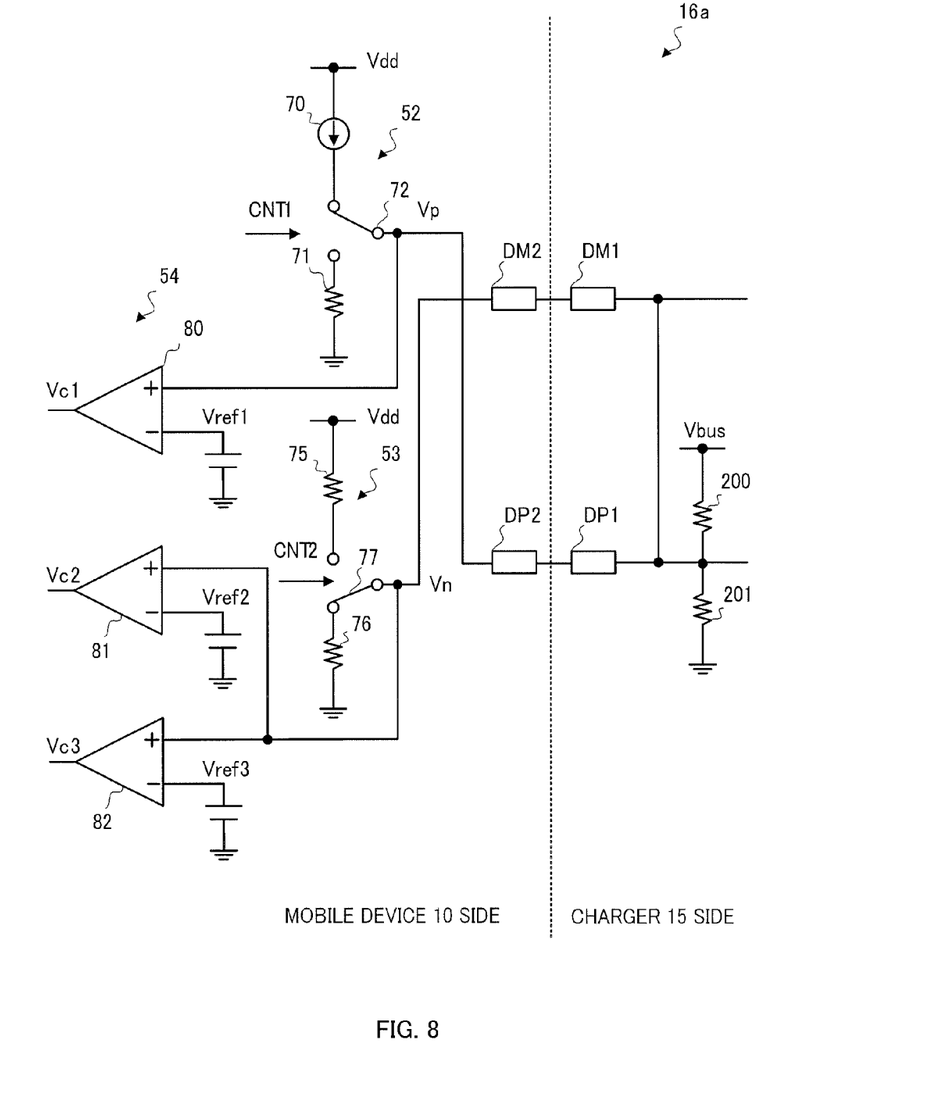
FIG. 8 is a diagram for describing comparison signals Vc1 to Vc3 when a plug 16a is connected.

In an embodiment of the present invention, as depicted in FIG. 8, for example, in the "first step" in which the terminal DP2 is "pulled up" while the terminal DM2 is "pulled down" with the plug 16a of the charger 15a being connected to the mobile device 10, the resistance values of the resistors 71, 75, and 76 and the current value of the current source 70 are selected so that all the comparison signals Vc1 to Vc3 go high (hereinafter "H"). Further, in the "second step" in which the terminal DP2 is "pulled down" while the terminal DM2 is "pulled up", the resistance values of the resistors 71, 75, and 76 and the current value of the current source 70 are selected so that the comparison signal Vc1 goes high.

Figure 9:
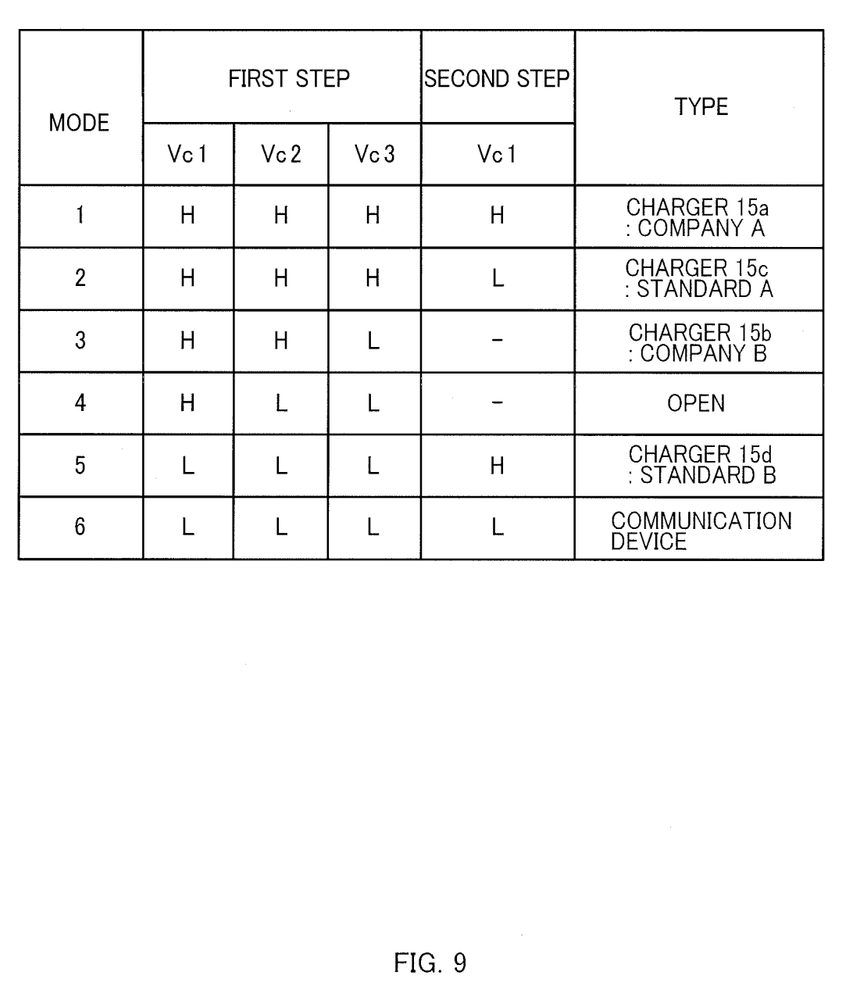
FIG. 9 is a diagram illustrating an example of comparison signals Vc1 to Vc3 when devices of different types are connected.

In an embodiment of the present invention, the values of the resistor 71, etc., are selected so that the comparison signals Vc1 to Vc3 outputted in the "first step" and the "second step" are set at levels depicted in FIG. 9 when each of the plugs 16b to 16d of the chargers 15b to 15d and a plug of a communication device (not depicted) is connected to the mobile device 10. As such, the values of the comparison signal Vc1, etc., outputted at the respective predetermined timings Ta and Tb in the "first step" and the "second step" vary with models. Thus, the discrimination data output circuit 85 can discriminate the type of the device connected to the mobile device 10.

<<Operation of Determination Circuit 30>>

Figure 10:
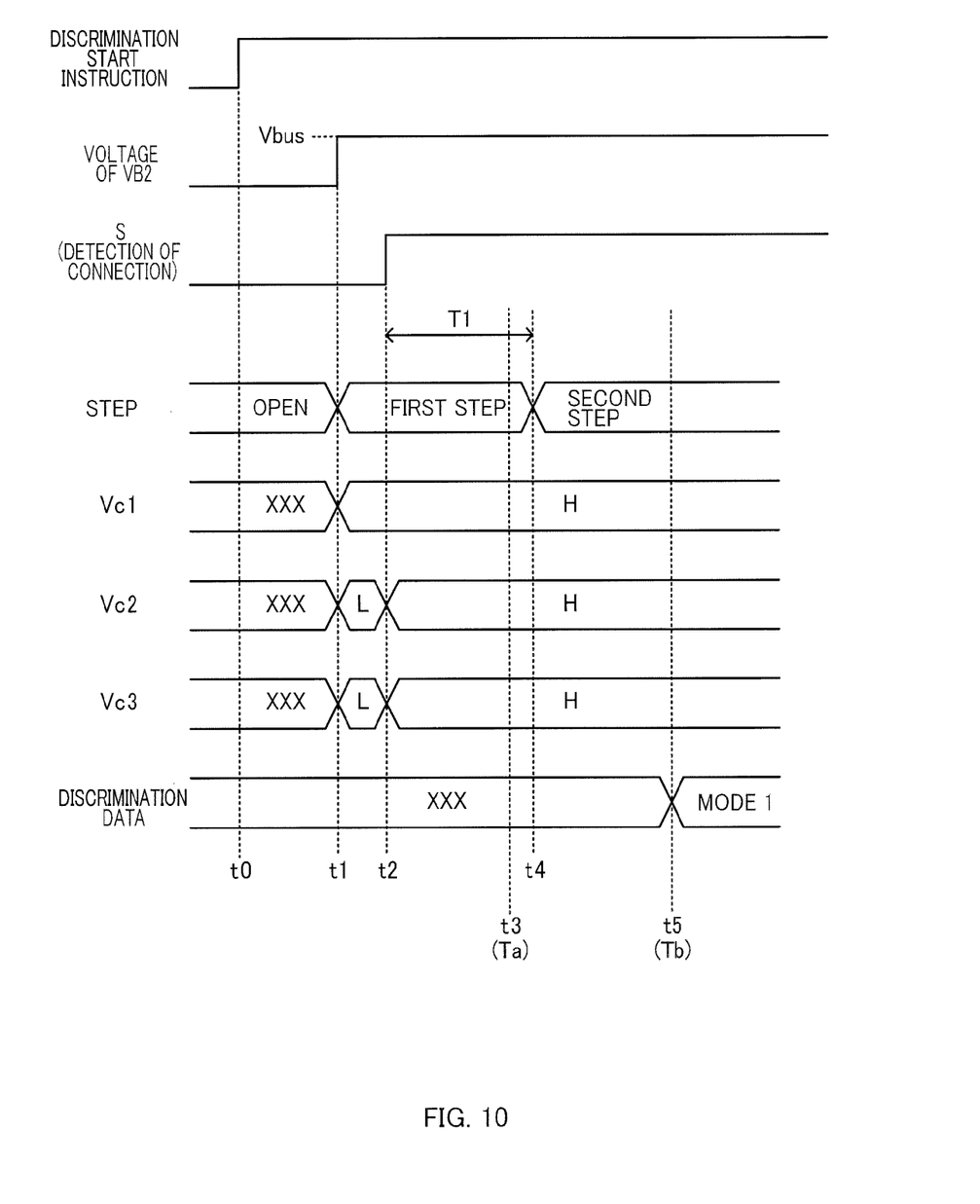
FIG. 10 is a timing chart for describing an operation of a determination circuit 30.

FIG. 10 is a timing chart for describing an operation of the determination circuit 30. It is assumed here that the plug 16a of the charger 15a of Company A is connected to the mobile device 10.

At time t0, a discrimination start signal (high-level signal) to discriminate a device connected to the mobile device 10 is input from the CPU 33.

At time t1, when the plug 16a is inserted to the port 20 and the terminals VB1 and GN1 are connected to the terminals VB2 and GN2, the voltage of the terminal VB2 reaches the voltage Vbus. As a result, the terminals DP2 and DM2 enter the state of the "first step". At time t2, when the terminals DP1 and DM1 are connected to the terminals DP2 and DM2, the signal S goes high.

At the timing Ta before the time period T1 has elapsed from time t2, i.e., at time t3 when terminals DP1, DM1 and the terminals DP2, DM2 sufficiently stabilize after being respectively connected to each other, the discrimination data output circuit 85 acquires (Vc1, Vc2, Vc3)=("H", "H", "H").

At time t4 when the time period T1 has elapsed from time t2, the terminals DP2 and DM2 enter the state of the "second step". At time t5 (timing Tb) when the state of the terminals DP2 and DM2 sufficiently stabilize after being changed into the state of the "second step", the discrimination data output circuit 85 acquires VC1="H". Based on the logic level of the comparison signal Vc1 acquired at time t5 and the logic levels of the comparison signals Vc1 to Vc3 acquired at time t3, the discrimination data output circuit 85 outputs the discrimination data indicating that the model connected to the mobile device 10 is "Mode 1 (the charger of Company A)". Thus, the CPU 33 can cause the charging circuit 34 to charge the battery 35 with a charging current conforming to the standard of Company A.

Hereinabove, a description has been given of the determination circuit 30 according to one embodiment of the present invention. The determination circuit 30 outputs the discrimination data that is changed with the impedance (resistance value) of the device. Thus, the determination circuit 30 can reliably discriminate a type of the device connected to the mobile device 10. Further, the discrimination circuit 54 detects the values of the comparison signals Vc1 to Vc3 in the "first step" after the terminals DP1, DM1 and the terminals DP2, DM2 are respectively connected to each other. Thus, the determination accuracy of the device can be improved. In an embodiment of the present invention, the terminals DP2 and DM2 are set to the state of the "first step" and thereafter are changed to the state of the "second step". Therefore, it becomes possible to discriminate more types of devices.

Although the "discrimination start instruction" is set at high level at time t0 in FIG. 10, it is not limited thereto. For example, the "discrimination start instruction" may be changed to high level in a state where the charger 15 etc., are connected to the mobile device 10. In such a case, since the discrimination process is executed at the timing when the "discrimination start instruction" goes high, the CPU 33 can execute the discrimination process at arbitrary timing, for example.

In an embodiment of the present invention, the current source 70, the resistor 71, etc., are used when the terminal DP2, etc., are "pulled up" and "pulled down". Thus, for example, as compared to the case where a voltage of a battery, etc., are directly applied to the terminal DP2, etc., the voltage Vp of the terminal DP2 remarkably changes when the terminals DP1 and DP2 are connected to each other. Further, in an embodiment of the present invention, the current value of the current source 70, the resistance value of the resistor 71, etc., are selected so that the voltage Vp changes more remarkably, i.e., the time constant of the voltage Vp becomes greater. As described above, an element connected to the terminal DP2 may be any element (e.g., resistor, current source) capable of "pulling up" or "pulling down" the terminal DP2.

In a state where the power-supply voltage Vbus is not applied to the terminal VB2, the terminals DP2 and DM2 are in the open state. Thus, for example, if the plug 16 is pulled out of the mobile device 10, the switches 70 and 77 of the voltage application circuits 52 and 53 that apply voltages to the terminals DP2 and DM2 are reset.

The determination circuit 30 is configured with hardware in an embodiment of the present invention, but may be configured with functional blocks realized by execution of programs by a microcomputer etc., (not depicted), for example.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:
1. A determination circuit comprising:
 a first detecting unit configured to detect whether first and second power-supply terminals are connected to each other, based on a voltage at the second power-supply terminal of a coupling unit, the coupling unit including:
the second power-supply terminal connectable to the first power-supply terminal of a device including the first power-supply terminal applied with a power-supply voltage and first and second terminals, and
third and fourth terminals connectable respectively to the first and the second terminals having impedance corresponding to a type of the device, after the first power-supply terminal and the second power-supply terminal are connected to each other;
a voltage applying unit configured to, when the first and the second power-supply terminals are connected to each other, apply a first voltage to the third terminal as well as apply a second voltage to the fourth terminal;
a second detecting unit configured to detect that the first and the second terminals are connected to the third and the fourth terminals, respectively, when a voltage level at the third terminal is not equal to a level of the first voltage or when a voltage level at the fourth terminal is not equal to a level of the second voltage, after the second voltage is applied to the fourth terminal while the first voltage is applied to the third terminal; and
a discrimination unit configured to discriminate a type of the device based on voltages at the third and the fourth terminals when it is detected that the first and the second terminals are connected to the third and the fourth terminals, respectively.

2. The determination circuit of claim 1, further comprising:
a timer configured to measure a predetermined time period from a time when it is detected that the first and the second terminals are connected to the third and the fourth terminals, respectively, wherein
the voltage applying unit is further configured to, when the timer has measured the predetermined time period, apply a third voltage different from the first voltage to the third terminal as well as apply a fourth voltage different from the second voltage to the fourth terminal, and wherein
the discrimination unit is further configured to discriminate a type of the device, based on voltages at the third and the fourth terminals obtained from a time when it is detected that the first and the second terminals have been connected to the third and the fourth terminals, respectively, to a time when the timer has measured the predetermined time period, and based on voltages at the third and the fourth terminals obtained after the timer has measured the predetermined time period.

3. The determination circuit of claim 1, wherein
the voltage applying unit is further configured to, when the first and the second power-supply terminals are connected to each other and a signal to instruct start of discrimination of a type of the device is inputted to the voltage applying unit, apply the first voltage to the third terminal as well as apply the second voltage to the fourth terminal.

4. The determination circuit of claim 1, wherein
the voltage applying unit is further configured to, when the first and the second power-supply terminals are connected to each other, apply the first voltage via a first element to the third terminal as well as apply the second voltage via a second element to the fourth terminal.

5. The determination circuit of claim 1, wherein
the voltage applying unit is further configured to, when it is detected that the first and the second power-supply terminals are not connected after the first and the second power-supply terminals are connected to each other, stop applying voltages to the third and the fourth terminals.

* * * * *